Aug. 9, 1927.
C. H. HALL ET AL
1,638,396
FUEL STOKING DEVICE
Filed July 11, 1925     3 Sheets-Sheet 1
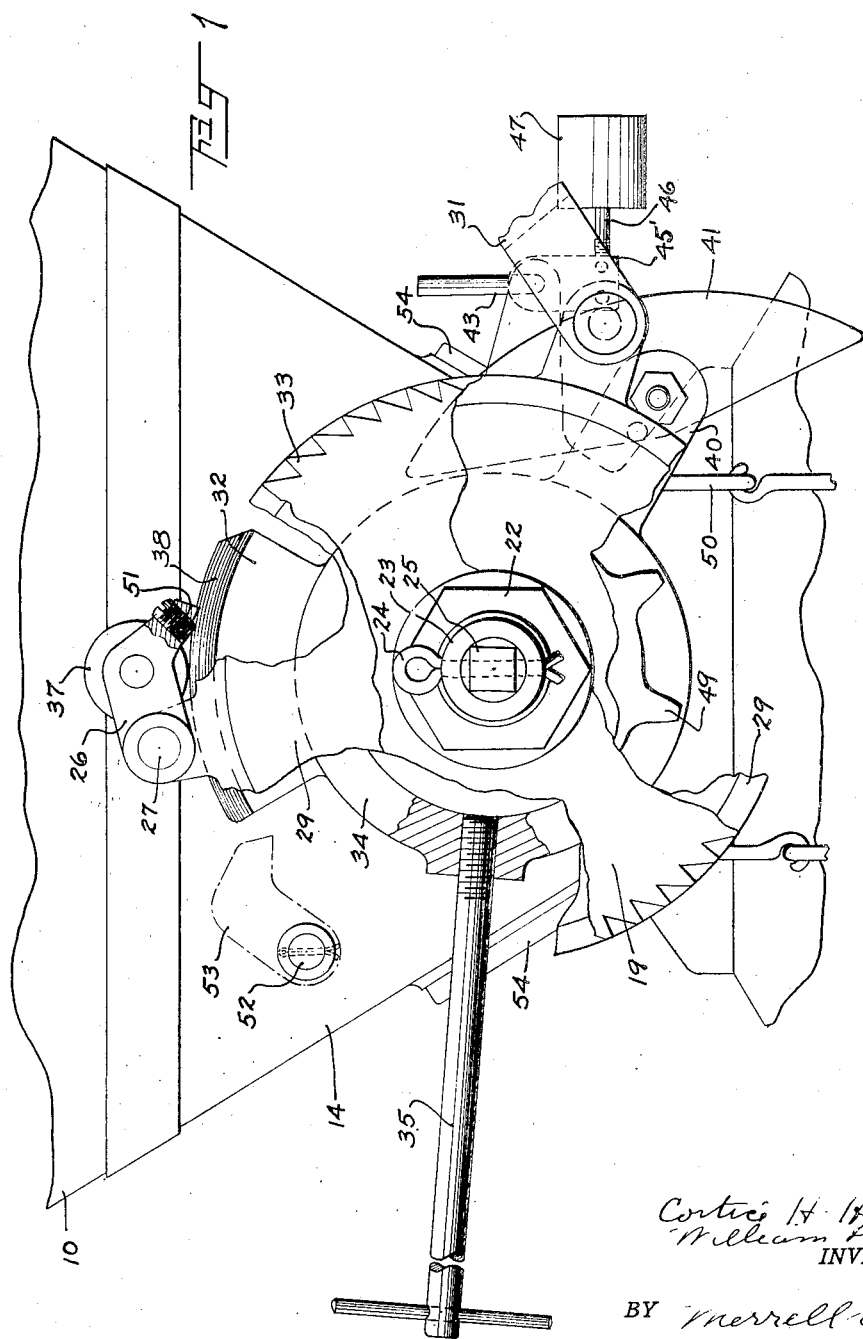

Aug. 9, 1927.
C. H. HALL ET AL
1,638,396
FUEL STOKING DEVICE
Filed July 11, 1925
3 Sheets-Sheet 2
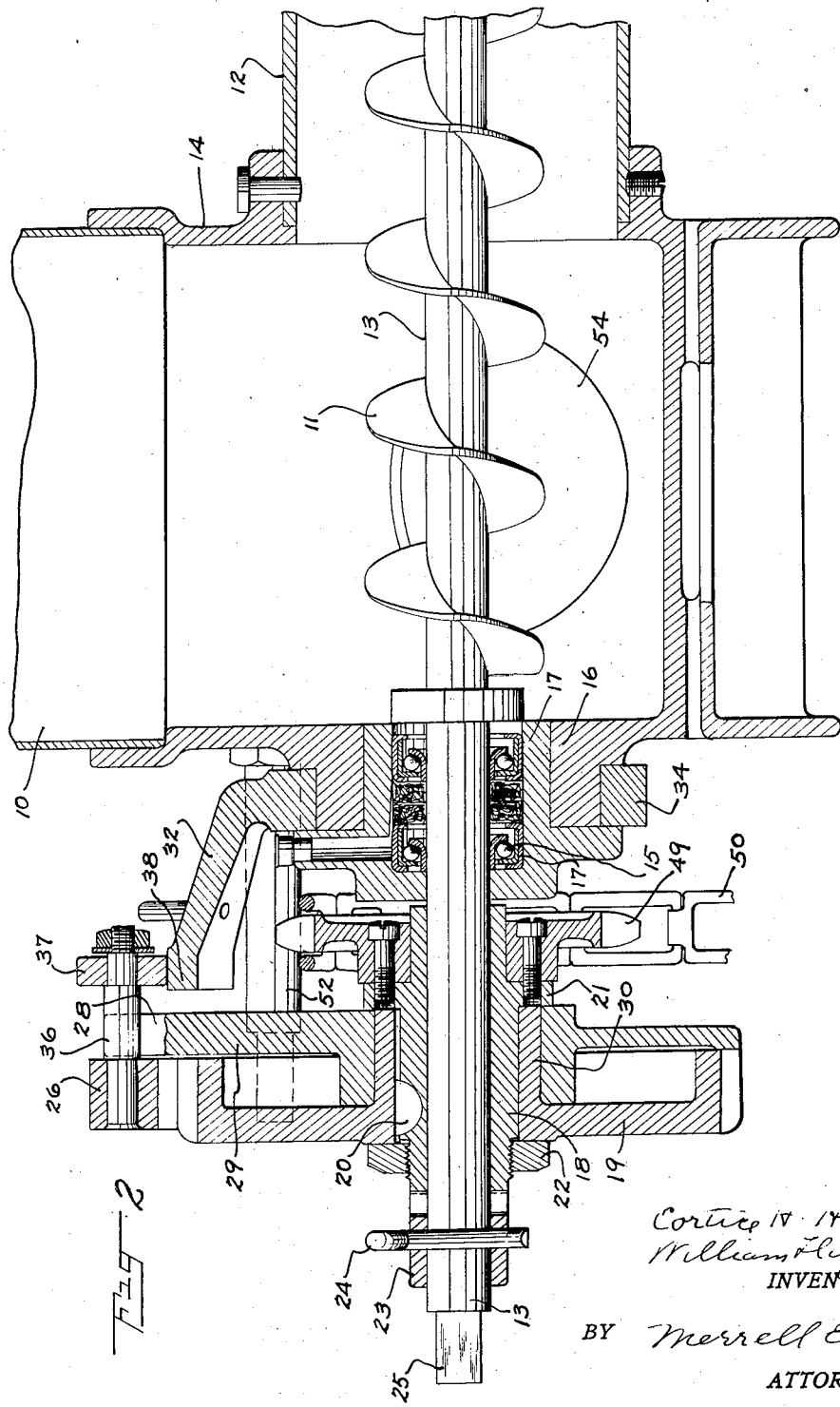

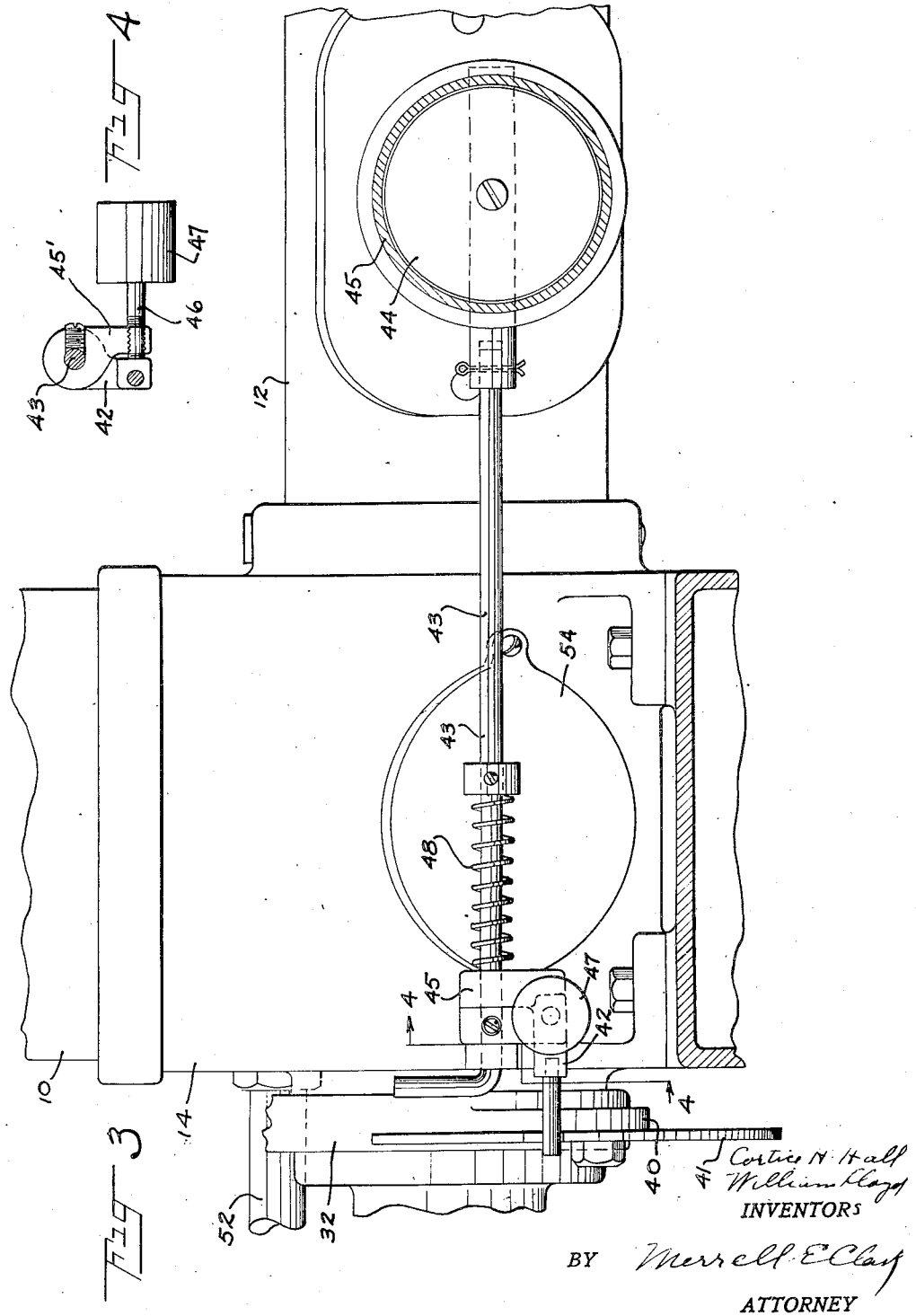

Patented Aug. 9, 1927.

1,638,396

UNITED STATES PATENT OFFICE.

CORTICE H. HALL, OF PATERSON, NEW JERSEY, AND WILLIAM LLOYD, OF HAZLETON, PENNSYLVANIA, ASSIGNORS TO DOMESTIC STOKER COMPANY, OF NEW YORK, N. Y., A CORPORATION OF DELAWARE.

FUEL-STOKING DEVICE.

Application filed July 11, 1925. Serial No. 42,927.

This invention relates generally to the construction of operating and controlling mechanism for fuel feeding or stoking devices for use with furnaces of the household or domestic type.

In prior installations of stoker apparatus for feeding fuel to domestic furnaces difficulty has been found in providing operating means for the fuel charging mechanism which will function effectively and with a minimum amount of attention for prolonged periods of time. In addition, the controlling mechanism by which the rate of feed of fuel and the supply of air to the burner is regulated has involved complicated mechanism likely to get out of order and relatively expensive to install and maintain in operative condition.

A general object of the present invention is to provide operating and controlling mechanism for fuel charging devices which will be free from the objections referred to and which will be characterized by simplicity of structure and efficiency and certainty of operation.

The invention includes ratchet and pawl mechanism arranged to directly actuate the operating draft of a fuel feeding device, controlling means being provided for varying the effective range of the operating stroke of the ratchet actuating pawl with relation to the teeth of the ratchet. Variations thus made in the length of the operating stroke of the pawl member result in corresponding variations in the rate at which fuel is fed to the burner. At the same time a damper mechanism controlling the supply of air to the burner is actuated in accordance with the amount of fuel being fed into the burner.

Another feature of the invention resides in the provision of means for preventing breakage or injury to the apparatus in the event that the feeding device becomes clogged or jammed.

Other features of the invention will be hereinafter referred to.

In the drawings, in which a preferred embodiment of the invention has been selected for illustration:—

Figure 1 is a view in front elevation, with parts broken away, of a stoker operating and controlling device embodying the invention.

Figure 2 is a vertical sectional view of the device shown in Figure 1.

Figure 3 is a view in side elevation of a portion of the device shown in Figure 2.

Figure 4 is a sectional view taken on the line 4—4 of Figure 3, showing a detail of the device.

Referring to the drawings for a more detailed description of the invention, a fuel supply hopper 10 is provided with a screw conveyor 11 for feeding fuel, such as finely divided coal, from the hopper 10 through the conduit 12 to a burner which may be located in the combustion chamber of a furnace of the household or other type.

The operating shaft 13 of the conveyor 11 extends through the base portion 14 of the hopper 10 and is journaled in ball bearings 15 mounted in a lug or extension 16 formed on the wall of the member 14. A cup-shaped member 17 is fitted into the lug 16 and forms a housing and seat for the bearings, as is clearly shown in Figure 2 of the drawings.

The conveyor shaft 13 projects beyond the bearing support 17 and supports on the extended portion a sleeve or hub member 18 which supports, in turn, a ratchet wheel 19 keyed to the hub 18 as at 20 and held in place against a rear flange 21 on the hub member by a locking ring 22. The hub member 18 is notched at its outer extremity for toothed engagement with a correspondingly notched sleeve member 23 which is keyed to the shaft 13 by means of the cotter pin 24.

With the construction described it will be seen that rotation of the ratchet wheel 19 will rotate the hub member 18, to rotate the sleeve 23 and, through the cotter pin 24, rotate the conveyor drive shaft 13. By this arrangement clogging or jamming of the conveyor parts will result in the shearing of the cotter pin 24 thereby eliminating breakage of parts of the mechanism. The accessability of the sleeve 23 renders the substitution of another cotter pin for the one destroyed a very simple matter.

To further facilitate the clearing of an obstruction from the conveyor the terminal portion 25 of the drive shaft 13 is squared for the application of a hand crank thereto.

Operating mechanism for the ratchet wheel 19 includes a pawl member 26 pivotally supported on a shaft 27 carried by a radial projection 28 on a disk 29 rotatably mounted on a hub portion 30 of the ratchet wheel 19. The disk 29 and the pawl carried thereby are oscillated through a link 31 connecting the shaft 27 with a crank arm or other suitable source of motion associated with the operating motion.

In order to vary the length of the effective stroke of the pawl member 26 a guard or shield member 32 is provided for preventing engagement of the pawl 26 with the teeth 33 of the ratchet during any desired portion of the operating stroke. The guard member 32 is provided with an annular portion 34 for rotatable seated engagement with the bearing supporting extension 16 on the hopper. A manually operable locking screw 35 is used to adjust the collar 34 about its axis to thereby vary the angular position of the pawl engaging guard member 32.

The pawl 26 is provided with a laterally extending pin 36 which supports a roller 37 adapted to roll on the curved periphery of the guard member 32 and hold the pawl out of contact with the ratchet. The roller 37 is arranged to drop off the righthand extremity 38 of the guard member, in Figure 1, to permit the pawl to move into engagement with the ratchet teeth 33. It will be seen that the position of the extremity 38 of the guard member determines at what point in its working stroke the pawl 26 will engage the ratchet teeth. If the guard member 32 be located substantially to the left, as viewed in Figure 1, the pawl 26 will engage a ratchet tooth near the beginning of its forward or working stroke and thereby rotate the ratchet through a substantial distance. If the guard member be adjusted substantially to the right, the ratchet 26 will engage a ratchet tooth near the finish of its stroke and thereby move the ratchet only a short distance. The rate of feed of the conveyor can thus be adjusted as desired.

Means are also provided for automatically varying the supply of air to the burner in accoradnce with the rate of supply of fuel thereto.

The collar 34 is provided with an extension 40 which supports a profile plate 41 whose outer edge engages a crank arm 42 arranged to adjust the damper rod 43 which controls the position of a damper valve 44 in the air supply conduit 45. With this arrangement the relation of the edge of the plate 41 with the crank arm 42 produces rotation of the damper rod 43 in a counter-clockwise direction when the collar is moved to increase the rate of feed of fuel. Counter-clockwise rotation of the damper rod opens the damper and vice versa.

An adjusting arm 45' on the damper rod 43 may have its angular position with relation to the crank 42 varied by means of the adjusting screw 46 terminating in a weighted head 47. This adjustment correspondingly adjusts the position of the damper with relation to the operating parts. A spring 48 on the shaft 43 assists the weight 47 in holding the crank 42 against the edge of the plate 41.

Other features of the construction include a sprocket wheel 49 mounted to rotate with the hub member 18 of the ratchet wheel 19 and provided with a chain 50 for operating an ash removing device or the like.

A noise eliminating member 51 formed of non-metallic material is inserted in the lower face of the pawl 26 to prevent the production of noise in the reversing movement of the pawl over the teeth 33. It will be seen that the member 51 is located to engage the sloping faces of the teeth and prevent engagement of the pawl itself therewith.

A pawl supporting pin 52 is provided on which a holding pawl 53 may be mounted if desired.

In Figure 3 of the drawings a hand-hole cover member 54 is shown in the base portion 14 of the hopper. This provides access to the conveyor should such access be desirable for any purpose.

What is claimed is:—

1. A fuel feeder for furnaces comprising, a fuel conveyor driving shaft, a ratchet wheel carried by the shaft, a pawl-carrying member mounted for oscillation about the shaft as a center, a pawl carried by said member for engagement with the teeth of the ratchet, means for oscillating said member to thereby intermittently rotate the ratchet and the shaft, a frangible connection between the ratchet wheel and the shaft and a sprocket wheel connected to the ratchet wheel for rotation therewith.

2. A fuel feeder for furnaces comprising, a fuel conveyor driving shaft, a sleeve carried by the shaft, a ratchet wheel mounted on the sleeve and keyed thereto, said sleeve having a frangible connection with said shaft, a pawl-carrying member mounted for oscillation about said shaft as a center, a pawl carried by said member for engagement with the teeth of the ratchet wheel, means for oscillating said pawl-carrying member to thereby intermittently rotate the ratchet and the driving shaft and a sprocket wheel attached to said sleeve for rotation therewith.

3. A fuel feeder for furnaces comprising a fuel conveyor driving shaft, a sleeve carried by the shaft, a ratchet wheel mounted on the sleeve and keyed thereto, said sleeve having a frangible connection with the shaft, a pawl-carrying member journaled on the hub of the ratchet wheel for oscillating movement thereon, a pawl carried by said member for engagement with the teeth of the ratchet wheel, and means for oscillating said pawl-carrying member.

4. A fuel feeder for furnaces comprising, a fuel conveyor driving shaft, a sleeve carried by the shaft, a ratchet wheel mounted on the sleeve and keyed thereto, a second sleeve member removably mounted on the shaft and having a toothed engagement with the end of the first-named sleeve, a frangible pin connecting said second-named sleeve with the shaft, a pawl member for operating said ratchet wheel, and means for oscillating the pawl member.

5. A fuel feeder for furnaces comprising, a fuel conveyor driving shaft, a ratchet wheel mounted on the shaft, a pawl-carrying member mounted to oscillate about the shaft as a center, a pawl pivotally carried by the pawl-carrying member, a guard member mounted for angular adjustment about said shaft, means extending laterally from the pawl for engaging said guard member to control the effective engagement of the pawl with the ratchet, and a sprocket wheel mounted for rotation with said ratchet wheel and operating between said guard member and the ratchet wheel.

6. A fuel feeder for furnaces comprising, a fuel conveyor driving shaft, a ratchet wheel mounted on the shaft, a pawl-carrying member mounted to oscillate on the hub portion of the ratchet wheel, a pawl pivotally carried by said member, a guard member mounted for angular adjustment about the shaft, a pin extending laterally from said pawl member, a roller carried by the pin for engagement with said guard member to thereby control the effective engagement of the pawl with the ratchet and a sprocket wheel mounted for rotation with said ratchet wheel and operating between said guard member and the ratchet wheel.

7. A fuel feeder for furnaces comprising, a fuel conveyor driving shaft, a sleeve carried by the shaft and having a frangible connection with the shaft, a ratchet wheel mounted on the sleeve and keyed thereto, a pawl-carrying member mounted to oscillate on the hub portion of the ratchet wheel, a pawl pivotally carried by said member, a guard member mounted for angular adjustment about the shaft, and means carried by the pawl for engaging said guard member to control the effective engagement of the pawl with the ratchet.

8. A fuel feeder for furnaces comprising, a fuel conveyor driving shaft, a sleeve carried by the shaft, a ratchet wheel mounted on the sleeve and keyed thereto, a second sleeve member removably mounted on the shaft and having a toothed engagement with the end of the first-named sleeve, a frangible pin connecting said second-named sleeve with the shaft, a pawl-carrying member mounted to oscillate on the hub portion of the ratchet wheel, a pawl pivotally carried by said member, a guard member mounted for angular adjustment about the shaft, and means carried by the pawl for engaging said guard member to control the effective engagement of the pawl with the ratchet.

Signed at New York, in the county and State of New York, this 1st day of July, 1925.

CORTICE H. HALL.
WILLIAM LLOYD.